United States Patent [19]

Kirkham

[11] Patent Number: 4,951,709

[45] Date of Patent: Aug. 28, 1990

[54] HYDRAULIC SYSTEM AND MANIFOLD ASSEMBLY

[75] Inventor: Steven C. Kirkham, McHenry, Ill.

[73] Assignee: Komatsu Dresser Company, Libertyville, Ill.

[21] Appl. No.: 265,880

[22] Filed: Nov. 1, 1988

[51] Int. Cl.[5] .................................................. F16D 1/00

[52] U.S. Cl. .................................. 137/561 A; 137/269

[58] Field of Search ............... 137/884, 561 R, 561 A, 137/269

[56] References Cited

U.S. PATENT DOCUMENTS

| | | | |
|---|---|---|---|
| 2,652,069 | 9/1953 | Goheen | 137/561 A X |
| 3,391,703 | 7/1968 | Kay | 137/884 X |
| 3,572,368 | 3/1971 | Bullmer | 137/884 X |
| 3,646,963 | 3/1972 | Klee | 137/884 |
| 3,658,088 | 4/1972 | Jensen et al. | 137/884 X |
| 3,698,432 | 10/1972 | Kutz | 137/884 |
| 3,765,441 | 10/1973 | Chang | 137/884 X |
| 3,814,126 | 6/1974 | Klee | 137/884 |
| 3,881,513 | 5/1975 | Chang | 137/884 |
| 3,915,194 | 10/1975 | Friedrich | 137/884 |
| 4,449,426 | 5/1984 | Younger | 137/884 X |

FOREIGN PATENT DOCUMENTS 305460 7/1971 U.S.S.R. .............................. 137/884

*Primary Examiner*—John Rivell

[57] ABSTRACT

The invention provides an improved manifold assembly and hydraulic system for use in connecting hydraulic lines according to a predetermined circuit design. The invention is especially useful in a pilot control circuit for operating heavy equipment that is multifunctional or has the ability to operate multiple attachments. The manifold assembly comprises a baseplate having a plurality of inlet and outlet ports that are connected to various components in the hydraulic circuit. Connecting elements are then used to connect the designated inlet and outlet ports. In a preferred embodiment, the connecting elements include one or more channel plates attached to the baseplate that have segregated flow channels or passageways and interconnect the designated inlet and outlet ports. In order to convert the system from operation of one type of attachment to another, it is only necessary to exchange one set of designated channel plates for another. This provides ease and simplicity in the conversion from the use of one attachement to another.

11 Claims, 2 Drawing Sheets

HYDRAULIC SYSTEM AND MANIFOLD ASSEMBLY

FIELD OF THE INVENTION

The present invention relates to an improved manifold assembly for use in connecting lines in a hydraulic circuit according to a preselected circuit design. The manifold assembly consists of a baseplate with inlet and outlet ports connected to various components in a hydraulic circuit and connecting members attached to the base plate for interconnecting specified inlet and outlet ports. In one embodiment, the manifold assembly consists of one or more channel plates connected to the baseplate that direct the hydraulic fluid from inlet ports to specified outlet ports.

BACKGROUND

The present invention is an improved manifold assembly for use in connecting lines in a hydraulic circuit that may include several different accessories having different flow and pressure specifications. The improved manifold assembly allows the use of common control levers to operate the different accessories, and it deactivates any unnecessary control levers. The manifold is easily converted to change from the operation of one accessory to another. Additionally, the use of the improved manifold of the present invention in a hydraulic system reduces the number of main control valves and hoses required by the system.

In many types of heavy equipment, such as earth movers or bulldozers, several different attachments or accessories are included in order to allow the equipment to perform various types of functions. For example, a bulldozer typically includes several different accessories in addition to the dozer blade, such as one or more wagons, a scraper, ripper, etc. In addition, the dozer may be equipped to pull and operate various devices such as a water tanker. These and other types of accessories are typically controlled and operated by a hydraulic system that includes various pumps, valves, lines, and controls. For many uses, it is desirable that the equipment be multifunctional or capable of performing various functions utilizing different accessories. It is not uncommon for each of these accessories to have different hydraulic pressure and flow requirements for operation.

As a result, the hydraulic systems for multifunctional equipment are typically complex and intricate in providing a system to control and operate the various types of attachments. Conventional hydraulic systems include a set of control levers, separate pumps, valves, and lines for each type of attachment. In order to cut down on the duplication of these elements for each accessory, a consolidated hydraulic system was provided that is capable of operating various accessories. In order to change accessories in these consolidated systems, however it is necessary to redo the plumbing in the system to accommodate the new accessory. Further, various adjustments on circuit relief valves, pumps, and other control units in the hydraulic system may be required.

The present invention is designed to overcome much of the time-consuming and burdensome process of conversion required in changing from the operation of one accessory to another. The present invention eliminates extensive replumbing of hydraulic lines and the resetting of pressure relief valves as required in previous systems. The invention provides a means to easily convert from one accessory to another while reducing the number of main control valves and hydraulic lines in the circuit. Further, the invention allows different types of accessories to be controlled through common control levers and provides a means to deactivate any unused control levers.

SUMMARY OF THE INVENTION

The present invention provides an improved hydraulic system that includes one or more pumps, control valves, hydraulic lines, controls, and accessories requiring the same or different flow, pressure and control functions. Particularly, the invention is an improved manifold assembly for use in connecting hydraulic lines and diverting hydraulic flow according to a preselected hydraulic circuit design. The invention is particularly useful in providing ease of conversion in multifunctional systems. The improved manifold assembly is particularly designed for use in a relatively low-flow, low-pressure pilot control circuit.

The improved manifold assembly of the present invention comprises a baseplate having a plurality of inlet and outlet ports that are connected by hydraulic lines to various components in a hydraulic circuit. The circuit is designed so that one or more accessories may be operated using hydraulic flow through a combination of the lines attached to the inlet and outlet ports in the baseplate. The manifold further comprises connecting means having segregated fluid passageways for connecting designated inlet ports with designated outlet ports in the baseplate in order to interconnect the various components of the hydraulic circuit according to a predetermined circuit design for a particular accessory. In a preferred embodiment, the connecting means comprise one or more channel plates attached to the baseplate having fluid channels formed therein for connecting predetermined ports in the baseplate. The channel plates may also include various gasket and sealing means to prevent leakage of hydraulic fluid from the flow passageways. The channel plates are further designed to connect only the desired inlet and outlet ports while the remaining ports are either plugged or disconnected from the circuit. A set of channel plates is preferably dedicated to completing a particular circuit design for a particular accessory device. Thus, conversion to a different accessory only requires replacing the channel plates. This conversion may be simply accomplished by loosening the bolts holding the channel plates to the baseplate, removing the channel plates and connecting a new set of channel plates to the baseplate. The baseplate and channel plates also may be equipped with keying elements to ensure proper alignment of the channel plates with the baseplates. In this manner, the hydraulic system is easily converted from one accessory to another, and the necessary components in the hydraulic circuit for a particular component are activated while those components not required are deactivated.

BRIEF DESCRIPTION OF THE DRAWINGS

The foregoing and additional objects and advantages of the invention will be more apparent when the following detailed description is read in conjunction with the accompanying drawings, wherein like reference characters denote like parts in all views and wherein.

DETAILED DESCRIPTION

The present invention relates to an improved manifold assembly for use in connecting hydraulic lines according to a predetermined hydraulic circuit design. The invention is particularly useful in a multifunctional hydraulic system as the invention provides for easy conversion from the operation of one type of accessory to another. This conversion is effected by simply replacing one set of manifold plates with a different set. Each set of plates is designed to complete the hydraulic circuit as needed for the operation of a particular accessory. The circuit may be designed so that no other changes are necessary in converting from one accessory to another. The invention allows for use of common control levers and reduces the duplication of other features in the hydraulic system for each accessory.

The manifold assembly of the present invention comprises a baseplate having a plurality of inlet and outlet ports to which hydraulic lines are connected and connecting means having segregated fluid passageways for connecting certain of the inlet and outlet ports according to a predetermined hydraulic circuit design. The hydraulic lines are connected to various components in the hydraulic circuit, and the circuit is arranged so as to be multifunctional, i.e., capable of operating several different accessories, with the proper connection of the appropriate lines. In one embodiment, the connecting means comprise a series of short hoses with snap-on couplers that are connected to the specified inlet and outlet ports. Conversion of that system from the operation of a particular accessory to another simply requires a rearrangement of the connecting hoses on the baseplate.

Figure 1:
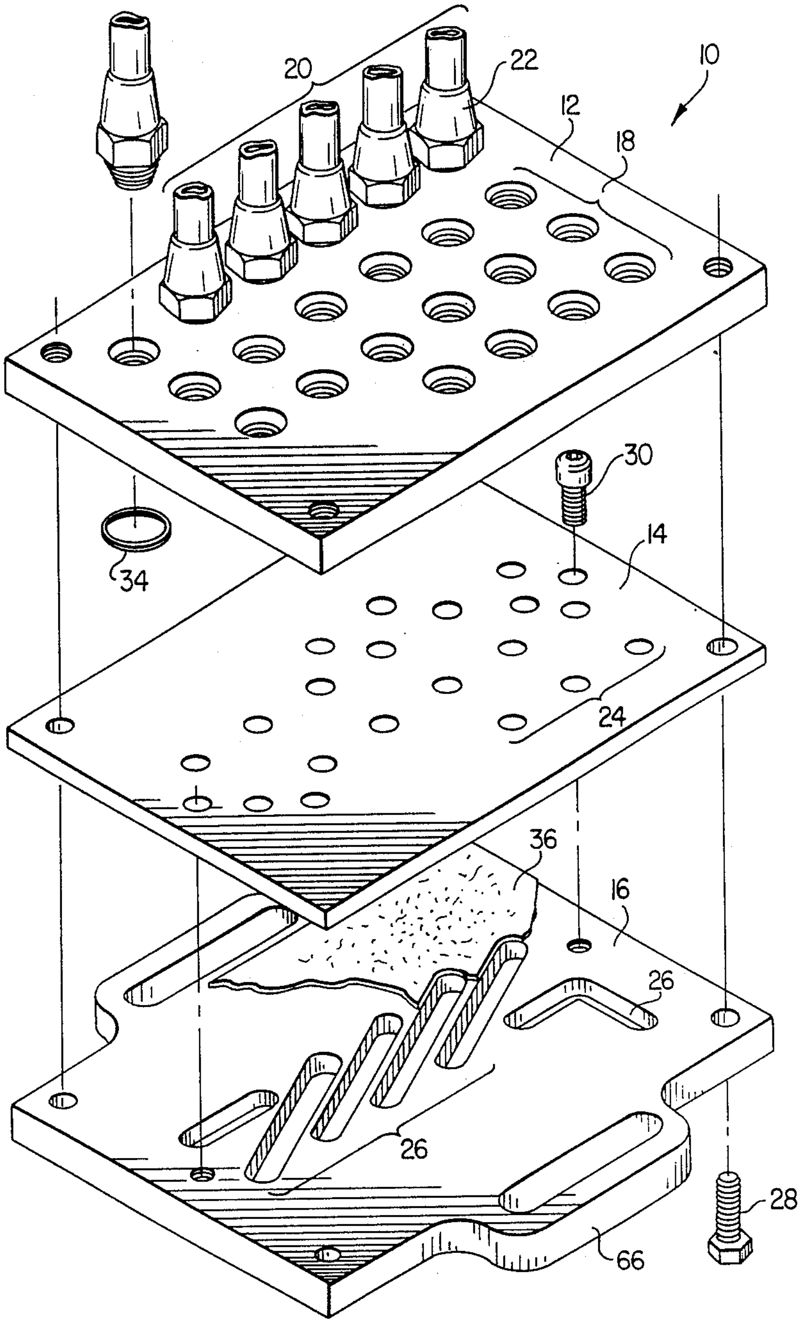
FIG. 1 is an exploded view of an improved manifold assembly as provided by the present invention.

An alternative and more preferred embodiment of the invention is shown in FIG. 1 in which the connecting means comprise a series of plates with channels formed in the plates for conducting fluid from an inlet to an outlet port in the baseplate. FIG. 1 shows a manifold 10 comprising a baseplate 12 and channel plates 14 and 16. Baseplate 12 includes ports 18 which are adapted to receive hydraulic lines 20 that are connected to various components in the hydraulic circuit. These various components, not shown in FIG. 1, may include controls, valves, pumps, reservoirs, etc. Lines 20 are connected to baseplate 12 using couplers 22. Baseplate 12 is adapted with internal threads in ports 18 to receive the threaded ends of coupler 22. Other hose connections as known in the art may also be used in place of the threaded connections shown in FIG. 1. Baseplate 12 may include as many ports 18 as required to connect the number of lines needed in the multifunctional system.

As shown in FIG. 1, plate 14 is an intermediate plate with fluid holes 24 corresponding to the particular ports 18 to be connected in the circuit design. Plate 16 has channels or ditches 26 that cooperate with fluid holes 24 to serve as connection means for connecting various of the ports 18 as required to complete the hydraulic circuit and operate a particular piece of equipment. In an alternative embodiment, plate 14 may also include channels or ditches cooperating with channels 26 in plate 16 to complete the predesigned circuit.

Figure 2:
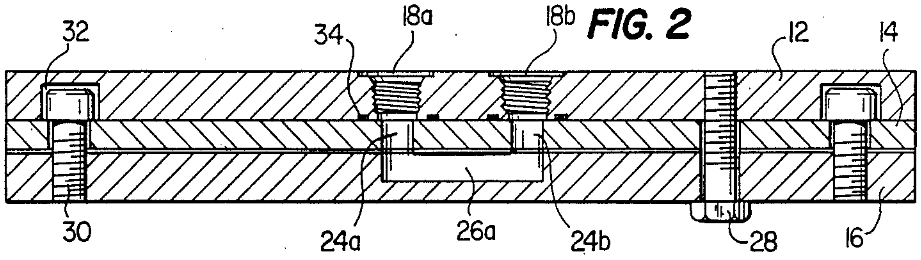
FIG. 2 is a partial cross-sectional view of an assembled manifold showing the bolt connections and a single fluid channel provided by two channel plates connected to the baseplate.
Figure 3:
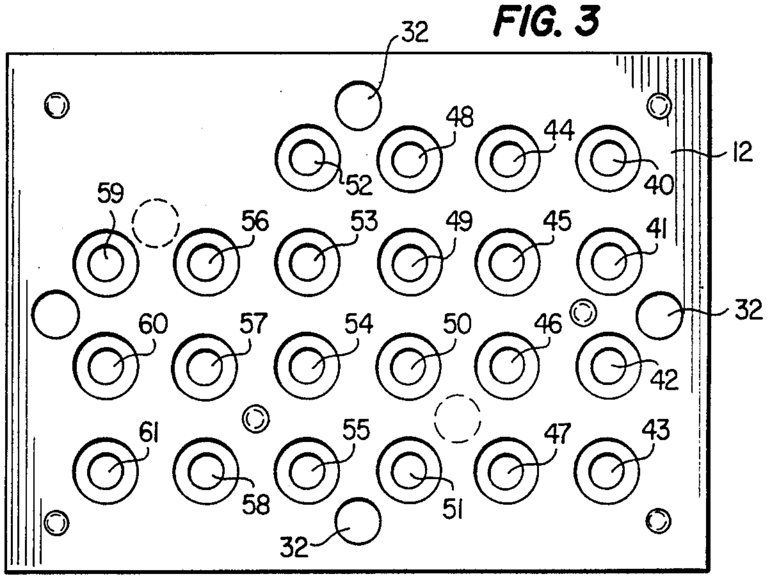
FIG. 3 is a bottom view of the baseplate shown in FIG. 1.

Channel plates 14 and 16 are connected to baseplate 12 by bolts 28, and plates 14 and 16 are connected to each other by bolts 30. As shown in FIGS. 2 and 3, baseplate 12 includes countersinks 32 for receiving the heads of bolts 30. Countersinks 32 and bolts 30 serve as keying elements for ensuring proper alignment of plates 14 and 16 with baseplate 12. Preferably, countersinks 32 and bolts 30 are staggered so as to prevent misalignment of the plates.

FIG. 1 also shows an O ring 34 seated on the plate side of baseplate 12 to prevent leakage of hydraulic fluid from ports 18. Additionally, FIG. 1 shows a gasket 36 interposed between plates 14 and 16 to eliminate problems of leakage between the plates. Gasket 36 would preferably have cutouts matching the channels 26 in plate 16.

As shown in FIG. 2, plates 14 and 16 corporate to form a fluid passageway between port **18*a* and port 18*b* through fluid holes 24*a* and 24*b*, and channel 26*a* in plates in 14 and 16. The arrangement of holes 24 in plate 14 and channels 26 in plate 16 is intended not only to connect the desired inlet and outlet ports in baseplate 12, but also to deactivate or close off those ports connected to hydraulic lines which are unnecessary. This is illustrated more fully with reference to FIG. 3 which is a bottom view of baseplate 12 shown in FIG. 1. Ports 18 shown in FIG. 1 are numbered 40–61 in FIG. 3 to illustrate the invention. With the configuration of fluid holes 24 and channels 26 shown in FIG. 1, plates 14 and 16 would connect ports 40, 41 and 45; 42 and 49; 46 and 53; 50 and 56; 54 and 59; and 60 and 57**. The remaining ports and the hydraulic lines connected to those ports would be stoppered by the manifold in this configuration.

Figure 4:
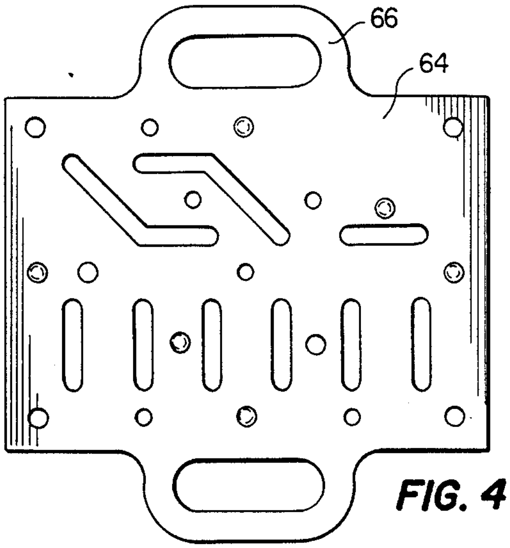
FIG. 4 is a view of an alternative arrangement for the channel plate effecting a different set of connections of inlet and outlet ports.

FIG. 4 shows a channel plate 64 with a different configuration of channels 26, and thus, it would connect different ports in baseplate 12 than channel plate 16. An intermediate plate 14 with a different pattern of fluid holes 24 may also be necessary. Thus, plate 64 could be used to operate a different accessory by providing a different hydraulic circuit than that provided by plate 16.

Manifold 10 provides for easy conversion from one hydraulic circuit to another by simply removing the channel plates and substituting a new set of plates with a different configuration. As indicated, plates 14 and 16 are bolted together by bolts 30 and thus can be removed as a unit by simply removing bolts 28. Plate 16 is provided with handles 66 to allow for ease of handling. The use of O rings 34 interposed between baseplate 12 and plate 14 provides a reuseable sealing element. Gasket 36 between plates 14 and 16 is not disturbed by the conversion process as plates 14 and 16 remain bound by bolts 30. In the conversion, plates 14 and 16 are removed as a unit and a new set of channel plates is inserted in the manifold.

The manifold assembly may be formed of any materials known in the art for use in manifolds and is preferably a cast metal that is capable of withstanding the pressures and heat associated with a hydraulic system. The plates may be of various thicknesses but are preferably the same shape and size.

The manifold assembly is particularly useful in a pilot control circuit as the manifold is more adapted to the lower flow rates and relatively lower pressures of a pilot circuit as opposed to a main hydraulic circuit for a particular accessory. The manifold is not particularly well suited for large flows and high pressures. The manifold could be used in a pilot control circuit to connect various controls, valves, etc. as will be understood by those skilled in the art.

From the foregoing detailed description, it is apparent that the invention describes an improved manifold assembly for use in connecting hydraulic lines according to a predetermined circuit design. The manifold allows for easy conversion from one circuit design to another associated with the operation of a different accessory or piece of equipment. To complete the desired circuit design for a particular accessory, channel plates dedicated specifically to that circuit design are attached to the baseplate thereby connecting particular hydraulic lines and deactivating others according to a predetermined circuit design. Having described only a few embodiments, it will be apparent to those skilled in the art that various modifications or adaptations may be made to the invention as described without departing from the scope of the present invention.

I claim:

1. An improved manifold assembly for use in connecting lines in a hydraulic circuit according to a preselected circuit design, the improved manifold comprising:

a baseplate having a plurality of inlet and outlet ports connected to components in the hydraulic circuit, the baseplate having a plate side and a hose side;

connecting means having segregated fluid passageways for connecting inlet ports with outlet ports in the baseplate according to a preselected hydraulic circuit design and said connecting means being assembled as a single unit and capable of independent removal from said baseplate without itself being disassembled;

one or more channel plates attached to said baseplate, and the channel plates having fluid channels formed therein for conducting fluid from one or more of the predetermined inlet ports to the corresponding preselected outlet ports in the baseplate; and keying elements formed in the baseplate and channel plate(s) for assuring proper alignment of the channel plates with the baseplate, said keying elements being the heads of bolts used to secure the channel plates together and corresponding countersunk holes in the plate side of the baseplate.

2. The manifold assembly of claim 1 wherein the connecting means further comprises means for plugging the non-connected ports in the baseplate and for redirecting the hydraulic pressure.

3. The manifold assembly of claim 1 further comprising gasket means interposed between the baseplate and the channel plate(s), for preventing leakage from the ports while allowing flow from the preselected inlet and outlet ports in the baseplate to the channel plate(s) and cooperating with the channel plate(s) to plug any nonconnected ports in the baseplate.

4. The manifold assembly of claim 2 further comprising a gasket interposed between two channel plates, said gasket allowing flow between the corresponding fluid channels in the channel plates and remaining undisturbed during conversion of the manifold from one mode of operation to another.

5. The manifold assembly of claim 1 wherein the gasket means comprise O rings surrounding each inlet and outlet ports on the plate side of the baseplate.

6. An improved hydraulic system including one or more pumps, valves, hydraulic lines, controls, and accessories having the same or different fluid pressure and control functions, the improvement comprising a manifold assembly for use in interconnecting the lines in the hydraulic system according to a preselected design, said improved manifold assembly comprising:

a baseplate having a plurality of inlet and outlet ports connected to components in the hydraulic system, the baseplate having a plate side and a base side;

connecting means having segregated fluid passageways for connecting inlet ports with outlet ports in the baseplate, said connecting means being arranged to connect inlet ports with outlet ports according to a preselected hydraulic circuit design and said connecting means being assembled as a single unit and capable of independent removal from said baseplate without itself being disassembled;

one or more channel plates attached to said baseplate, and the channel plates having fluid channels formed therein for conducting fluid from one or more of the inlet ports to the corresponding preselected outlet ports in the baseplate; and keying elements formed in the baseplate and channel plate(s) for assuring proper alignment of the channel plate(s) with the baseplate, said keying elements being the heads of bolts used to secure the channel plates together and corresponding countersunk holes in the plate side of the baseplate.

7. The improved hydraulic system of claim 6 wherein the connecting means further comprises means for plugging the non-connected ports in the baseplate and for redirecting the hydraulic pressure within the manifold.

8. The improved hydraulic system of claim 6 further comprising gasket means interposed between the baseplate and the channel plate(s), for preventing leakage from the ports while allowing flow from the preselected inlet and outlet ports in the baseplate to the channel plate(s) and cooperating with the channel plate(s) to plug any nonconnected ports in the baseplate.

9. The improved hydraulic system of claim 6 further comprising a gasket interposed between two channel plates, said gasket allowing flow between the corresponding fluid channels in the channel plates and remaining undisturbed during conversion of the manifold from the mode of operation to another.

10. The improved hydraulic system of claim 6 further comprising O rings around the inlet and outlet ports on the plate side of the baseplate.

11. An improved manifold assembly for use in connecting lines in a hydraulic circuit according to a preselected circuit design, the improved manifold comprising:

a baseplate having a plurality of inlet and outlet ports and having a hose and a plate side;

hydraulic lines connected to the inlet and outlet ports in the baseplate;

a first and a second channel plate attached to the baseplate having segregated fluid passageways for conducting fluid from preselected inlet ports to preselected outlet ports according to the circuit design with the first plate having apertures corresponding to the preselected inlet and outlet ports in the baseplate, and the second plate having channels or ditches for forming a fluid passageway between preselected holes in the first plate and said channel plates being held together by securing bolts offset from keying elements to allow the independent removal of said channel plates from said baseplate without said channel plates being separated;

O rings surrounding each inlet and outlet port on the plate side of the baseplate;

gasket means interposed between said channel plates for preventing leakage between the plates; and keying elements formed in the baseplate and channel plates for securing proper alignment of the channel plates with the baseplate, said keying elements being the heads of bolts use to secure the channel plates together and corresponding countersunk holes in the plate side of the baseplate.

* * * * *